United States Patent [19]

Miller

[11] 4,175,650
[45] Nov. 27, 1979

[54] SELF-ADJUSTING ELECTROMAGNETIC DISC CLUTCH

[75] Inventor: Donald L. Miller, Horseheads, N.Y.

[73] Assignee: Facet Enterprises, Inc., Tulsa, Okla.

[21] Appl. No.: 776,676

[22] Filed: Mar. 11, 1977

[51] Int. Cl.$^2$ .................. F16D 13/75; F16D 27/10
[52] U.S. Cl. ........................ 192/84 C; 192/111 A
[58] Field of Search .................. 192/84 C, 111 A

[56] References Cited

U.S. PATENT DOCUMENTS

| | | | |
|---|---|---|---|
| 2,893,528 | 7/1959 | Ryba | 192/111 A |
| 3,300,008 | 1/1967 | Mendenhall | 192/84 C |
| 3,484,816 | 12/1969 | Davidson | 192/84 C |
| 3,724,619 | 4/1973 | Miller | 192/111 A X |
| 3,744,609 | 7/1973 | Miller | 192/111 A |

Primary Examiner—Howard N. Goldberg
Attorney, Agent, or Firm—Remy J. VanOphem

[57] ABSTRACT

The invention is an electromagnetic friction disc clutch with wear compensating means having mutually opposing cooperating friction discs adapted for releasable coupling of a driving and driven rotary component. When this multiple disc friction clutch is energized by the stationary electromagnetic field, the armature moves in a direction so as to contact the stationary magnet body. The interaction between the armature and an adjustment member causes a wear compensated ring to move, and through a pressure plate the adjustment continues until the pressure plate bears against the friction disc pack. The force on the multiple disc pack increases until the torque between the armature and the magnet body is insufficient to overcome the friction between the armature and the adjustment ring. As the rotating armature bears against the stationary magnet body, the contacting surfaces wear away until all of the magnet force is applied to the disc pack. This leaves the smallest possible air gap obtainable between two members that rotate relative to each other, resulting in the highest obtainable output force, i.e., torque obtainable from a magnetic circuit. The adjustment process continues until the disc pack is worn out.

7 Claims, 5 Drawing Figures

SELF-ADJUSTING ELECTROMAGNETIC DISC CLUTCH

BACKGROUND OF THE INVENTION

1. Field of the Invention

The invention relates to electromagnetic clutches and, more particularly, to a self-adjusting multiple friction disc clutch having a stationary magnetic field.

2. Brief Description of the Prior Art

Self-adjusting clutches are well known in the art; however, in most of these devices, the adjusting feature occurs when the operating space between the armature and the magnet body exceeds a pre-determined value. That is, for the adjustment to take effect, the clutch must be released and re-engaged.

Some prior art designs have attempted to automatically self-adjust for wear of the frictional surfaces without requiring the clutch to release and to be re-engaged. However, these clutches, in effect, adjusted the disengaged spacing between the frictional surfaces in order to compensate for wear; that is, no adjustment occurred in these devices until the main friction surfaces wore to the extent necessary to actuate the self-adjusting mechanism. Thus, by their very nature these clutches did not maintain a constant pressure on the disc pack since the magnetic engaging force varied over the life of the clutch.

Continuous self-adjusting electromagnetic clutches have been broadly disclosed in the art; however, the teachings of these clutches fail to recognize the problems associated with the multiple friction disc stationary magnetic field clutches, with regard to flux flow and wear compensation. For example, U.S. Pat. No. 3,994,379 by Miller, owned by the assignee of the present invention, discloses a self-adjusting electromagnetic clutch wherein the stationary magnetic body is separated from other magnetic components in the magnetic circuit and, therefore, teaches a radial air gap around the magnetic body. This radial air gap results in a loss of efficiency of the clutch because of the loss of magnetomotive force which does not contribute to the magnetic holding force, resulting in a lower torque output for a specific unit of generated flux. To understand the importance of having very low air gaps in the magnetic circuit, one has only to consider that the magnetizing force required to produce 65 K lines in air as compared to iron is about 3800:1. Therefore, any radial air gap greatly effects the efficiency in terms of torque output for a given size magnetic body and coil.

Other prior art such as U.S. Pat. No. 3,724,619 as well as No. 3,744,609 by Miller, owned by the assignee hereof, further disclose continuous self-adjusting features, but teach the use of a radial air gap resulting in a certain percentage of flux leakage in the magnetic flux circuit. Again, the overall efficiency of the clutch is greatly reduced as a result of the radial air gaps.

SUMMARY OF THE PRESENT INVENTION

The invention is an electromagnetic multiple disc friction clutch having a stationary magnetic field wherein a plurality of torque transmitting friction members are mounted to an input and an output means. The friction members are adapted to transmit torque from an input means to an output means upon energization of an electromagnetic actuating means. The input means further has an inner body member with a passage means. A flux permeable armature is coaxially disposed with the input means directly adjacent said electromagnetic means and the armature further has a threaded internal surface. A pressure plate member is mounted within the passage means of the inner body member; one portion of the plate member communicates with the armature through an annular retarder member. The opposite end portion of the plate member is disposed adjacent the plurality of torque transmitting friction members for communication therewith. A means for biasing the pressure plate member is provided between the inner body member and the opposite end portion of the plate member. An annular retarder member is disposed adjacent the one end portion of the pressure plate member as well as coaxial with the armature member. The retarder member further has a means for biasing the armature whereby the biasing means causes the armature to rotate in one direction and restricts rotational motion of the armature in another opposite direction.

It is, therefore, an object of this invention to provide an improved, inexpensive, efficient self-adjusting electromagnetic multiple disc friction clutch having a stationary magnetic body wherein the air gap is only axial, and not radial.

It is a further object of this invention to provide a self-adjusting electromagnetic multiple disc friction clutch with a stationary magnetic field wherein the wear compensating means are not adversely effected by centrifugal force.

Another object of the invention is to provide a self-adjusting electromagnetic multiple disc friction clutch wherein the rotating armature bears directly against the stationary magnet body, and wherein the contacting surfaces wear away until all the magnet force is applied to the disc pack.

It is a still further object of this invention to provide an electromagnetic multiple disc friction clutch having the smallest possible air gap obtainable between the rotating armature and the stationary magnetic body, thereby resulting in the highest possible force obtainable from the magnetic circuit.

It is still another object of the invention to provide an electromagnetic self-adjusting multiple disc friction clutch wherein the adjusting process is continuous until the disc pack is worn out.

Still a further object of the invention is to provide a self-adjusting electromagnetic multiple disc friction clutch in which the electromagnetic engaging force is unaffected by wearing of the torque carrying members.

It is still a further object of this invention to provide a multiple disc clutch with automatic wear compensating means in which it is unnecessary to ever adjust the air gap between the armature and the magnetic pole faces since it is always maintained at or near zero.

Other objects and advantages of this invention will become apparent from the following detailed description taken in conjunction with the accompanying drawings and the appended claims.

DETAILED DESCRIPTION OF THE PREFERRED EMBODIMENT

Figure 1:
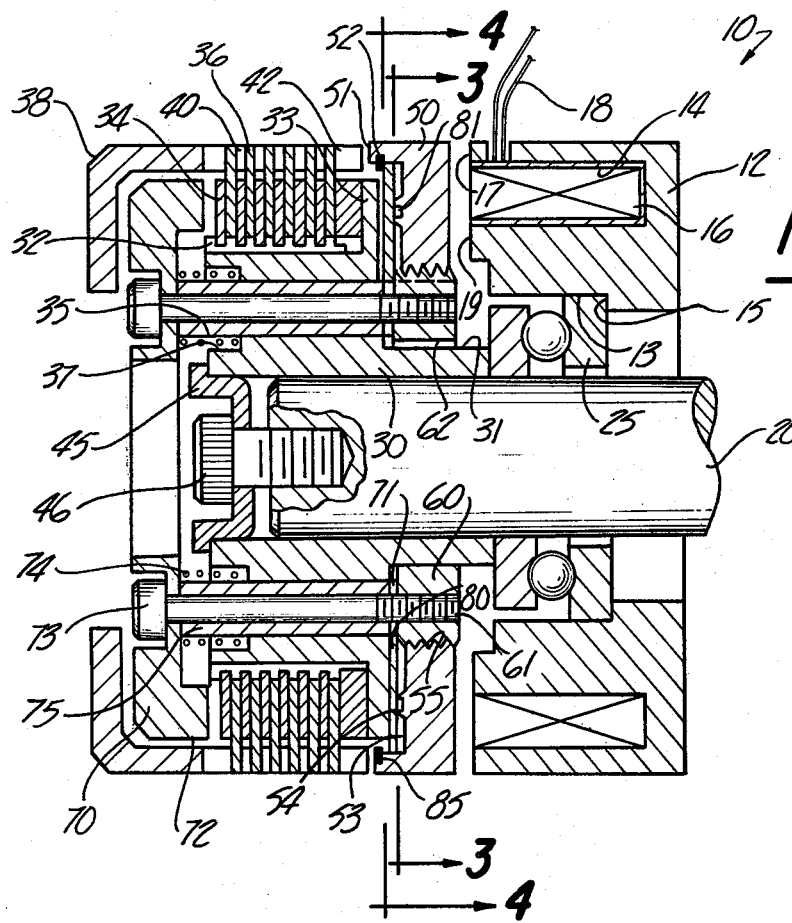
FIG. 1 is a schematic partial cross sectional view of the electromagnetic multiple disc friction clutch according to the present invention.

Referring to FIG. 1, an electromagnetic multiple disc friction clutch is shown generally designated by numeral 10. The clutch includes a fixed or stationary magnet body 12 adapted to be secured to a fixed mounting structure (not shown) and fabricated of magnetic flux conducting material such as iron or steel. The magnet body 12 is formed to provide an annular recess or cavity 14 within which is mounted an electromagnetic coil 16 which may be secured in the cavity by the use of a resin or other well known conventional means. The coil 16 has a set of leads 18 which may be connected to a control power source or control circuit (not shown) through an appropriate connector as is well known in the art (not shown).

The clutch of the preferred embodiment is reversible with respect to input and output sides and, thus, clutch structure which in one installation would be an input member, in another installation would be an output member. Accordingly, rotating input and output members referred to in the following description as driving and driven means, respectively, could also have been referred to generally as first and second torque transmitting members. However, for reasons of clarity in the description, the generic terminology was substantially avoided.

The magnet body is provided with a radial recess 13 on the inner diameter as well as a shoulder 15. The annular magnet body is freely mounted to a shaft 20 by means of a combination radial and end thrust bearing 25. The radial and end thrust bearing is mounted to the radial recess 13 of the inner body and against the shoulder 15.

The first element of the clutch axially aligned to the shaft 20 for rotation therewith is an inner body member 30 which may act as the driving member of the clutch. The rotary driving inner body member is held in position on the shaft by means of a retainer 45 and screw 46. The screw is threaded into the end of the shaft and the retainer locates the inner body member against the combined radial and end thrust bearing. The inner body member or driving member 30 includes a smooth lower shoulder 31 and axially extending splines 32 formed along one portion of its outer surface on which are slidably mounted a first plurality of annular friction discs 34. It will be readily understood that the spline connection fixes the first plurality of friction discs to the inner body member rotationally while permitting relative axial movement. A second plurality of friction discs 36 are alternately disposed between adjacent discs 34 to comprise a friction clutch multiple disc pack. Discs 36 are connected to the driven output or outer body member 38 which has an axially extending portion 40 with slots 42 providing an axially slidable but rotatably fixed connection with the friction discs 36.

The annular inner body member 30 has a radial projection 33 at one end forming a reaction plate at one end of the disc pack. The inner body member further has a plurality of radially spaced holes 35 at a predetermined distance between the spline 32 and the inner diameter of the inner body member. These holes are counter bored at one end 37 for a reason later to be disclosed.

An annular armature plate 50 is fabricated from magnetic flux conducting material and is arranged coaxial with the magnet body 12 spaced a small distance from the pole faces 17 and 19 of the magnet body. The radially outer most portion of the armature plate has an axial extension 51 wherein is provided a radial groove 52 on the inner diameter. The rear face 53 of the armature as viewed from the drawings is provided with a knurled surface 54 for a reason later to be described. The radially innermost surface of armature 50 is threaded entirely along the length of the inner diameter 55. Within the threaded inner diameter of the armature plate 50 there is threadably mounted an annular adjusting ring 60. The helical thread which links adjusting ring 60 to armature 50 is such that the armature 50 may rotate relative to the adjusting ring 60 (whenever the armature is energized) thereby imparting force vector components which tend to force the adjusting ring 60 axially to the right as viewed in the drawings. The adjusting ring 60 has a plurality of radially spaced holes 61 aligned with the holes 35 in the inner body member 30. Further, the inner most surface 62 of the annular ring is slightly tapered to provide a low friction sliding engagement with the surface 31 of the inner body member 30.

A pressure plate member 70 is mounted within the axial holes 35 of the inner body member 30. The pressure plate member 70 cooperates at one end 71 with the annular adjusting ring 60 and further communicates at the opposite end 72 with the friction discs when the electromagnetic clutch is energized. The plate member is mounted at one end 71 to the adjusting ring 60 by the use of a screw member 73 and a biasing spring 74. The screw member 73 is centrally mounted to the finger like projections 75 of the pressure plate member. The biasing spring 74 is mounted between the opposite end of the plate member 72 and the counterbore 37 in the inner body member 30. The one end 71 of the plate member further has a smooth surface upon which a retarder member 80 is mounted. The retarder member 80 is retained in its position by a snap ring 85 mounted in the groove 52 of the armature member 50. The retarder member further has a plurality of radially spaced detents 81 (see FIG. 4) which communicate with the knurled surface 54 of the rear face of the armature 50 as viewed in the drawings. The retarder member 80 being mounted to the one end 71 of the pressure plate member permits the retarder member to move axially, but non-rotatably, with respect to the pressure plate member.

The compression spring 74 mounted within the counterbore 37 of the inner body member 30 applies a retraction force tending to bias the armature plate 50 and the adjustment member 60 away from the magnet body member 12. With this retraction or clutch disengaging arrangement, the disengaged air gap between the armature 50 and the magnet body member 12 is held constant throughout the life of the clutch. Thus, the magnetic engaging force initially required to draw the armature 50 into contactive engagement with the magnet body member 12 is always the same.

Since the engaging force remains constant, and since the adjusting member 60 adjusts for any wear that occurs within the friction disc pack, the variances between the static and dynamic torques developed by the clutch are practically unchanged throughout the life of the clutch. Extensive testing with a clutch of the preferred embodiment has demonstrated that with the self-adjusting mechanism shown and described in this clutch, both static and dynamic torques have more than tripled over a clutch of similar construction without the self-adjusting feature.

Figure 2:
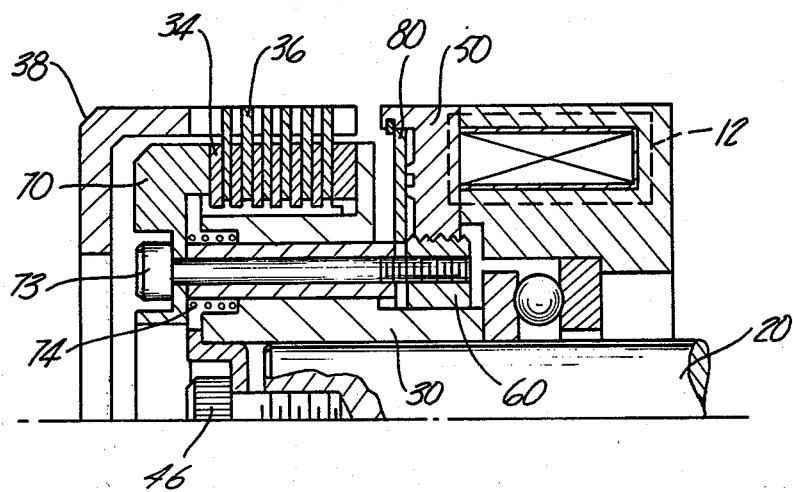
FIG. 2 is a partial sectional view of the electromagnetic multiple disc clutch in the energized condition.

FIG. 2 is a partial cross section of the preferred embodiment in the energized condition. Note that the armature and adjustment member are moved into contactive engagement with the magnet body, while the pressure plate member contactively engages the friction disc pack and applies a pressure to activate the clutching mechanism.

Figure 3:
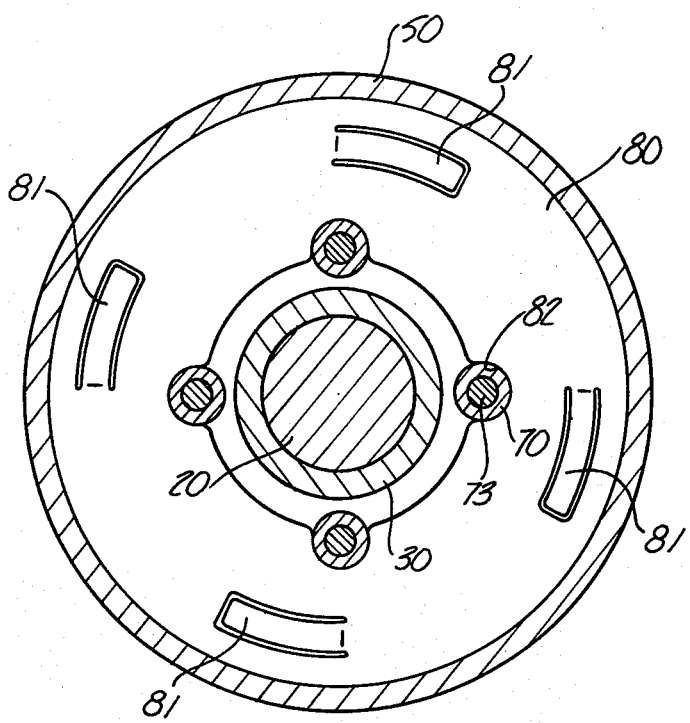
FIG. 3 is a partial sectional view along arrows 3—3 of FIG. 1.
Figure 5:
FIG. 5 is a side view of the retarder member.

Referring to FIGS. 3 and 5, there is shown the retarder member with four equally spaced retarder fingers 81. The fingers of the retarder member are in contactive engagement with the knurled surface 54 of the armature member 50 shown in FIG. 1. The selection of using four equally spaced fingers is strictly a matter of choice to facilitate description of the preferred embodiment. It is not intended to limit the scope thereof. As discussed earlier, the retarder member 80 moves axially but non-rotatably with respect to the armature 50. This is accomplished by providing an axial slot 82 in the retarder member which surrounds the outside diameter of the one end of the pressure plate member. As earlier set forth, the clutch of the present invention is reversible with respect to the input and output sides. Thus, the retarder member fingers may be reversed in the opposite direction of that shown so that the armature rotation can be controlled according to the selection of the shaft as an input or output member.

Figure 4:
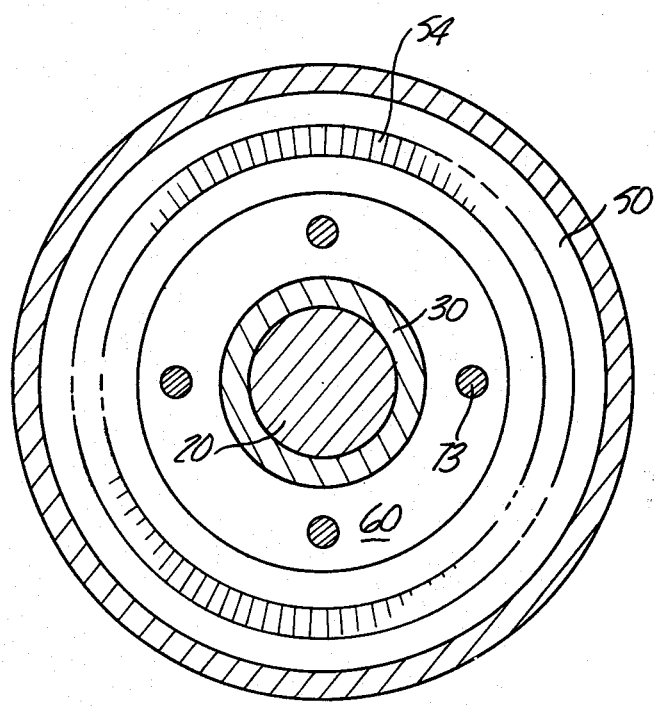
FIG. 4 is a partial sectional view in the direction of arrow 4—4 of FIG. 1.

FIG. 4 is a view along arrows 4—4 of FIG. 1 and shows the cross sectional areas of the clutch as well as the knurl 54 on the rear face of the armature. It is this knurled surface 54 which communicates with the fingers 81 of the retarder 80 to provide the adjustment feature in conjunction with the adjustment ring 60.

Operation of the Preferred Embodiment

The clutch, as illustrated in FIG. 1, is shown in the disengaged position whereby the driven and driving rotary members are frictionally uncoupled. When the clutch is desired to be engaged, electrical power is supplied through the leads 18 to the coil 16 which generates a magnetic field according to the flux path illustrated by the dash lines in FIG. 2. The flux path travels in a loop through the magnet body 12, across the upper axial air gap, through the armature and returns back to the magnet body member across the lower axial air gap.

The magnetic flux exerts an axial pull across the air gap pulling the armature plate 50 into contactive engagement with the magnet body 12. As the armature 50 is moved axially into engagement with the pole faces of the magnet body, the magnetic engaging forces exerted on the armature are completely axial and, therefore, provide a closed contact between the pole faces of the magnetic body and the armature. As the armature moves axially toward the magnet body, the rotational velocity of the armature is decreased by the static condition of the magnet body member. The opposite end of the pressure plate member, which continues to rotate at the input shaft speed through the inner body member, is caused to move axially towards the friction plate members by the action of the mutually engageable thread between the armature and the adjustment ring member. This is as a result of the small difference in speed between the armature, which is slowing down as it approaches the stationary magnet body, and the adjustment ring which continues to travel at the input shaft speed. The opposite end of the pressure plate member is thereby moved into engagement with the friction disc pack. It is readily observed that when the rotating armature bears against the stationary magnet body, the contacting surfaces will wear away until all of the magnet force is applied to the disc pack. This will leave the smallest possible air gap obtainable between two members that rotate relative to each other, resulting in the highest possible output force or torque obtainable for the given electromagnet and coil size.

Whenever the electromagnetic winding is de-energized, the armature and the adjustment ring are axially withdrawn from the magnet body member under the influence of a biasing force applied by a fixed spring mounted in the counterbore of the inner body member. Upon becoming de-energized, the armature member, inner body member and adjustment ring rotate at the same speed. Relative motion between these elements is not possible due to the nature of the design of the retarder member. The fingers of the retarder member act upon the knurled surface of the armature in such a way as to prevent relative motion between the armature and the adjustment ring member upon de-energization of the electromagnetic coil. The armature member and the adjustment ring member, with respect to each other, therefore, remain in exactly the same position as in the prior energized position. Therefore, when the electromagnet is again energized, the armature, adjustment member, and the pressure plate member will move towards the magnet body and the friction disc packs, respectively, and resume the same basic relative position between the pressure plate member and the friction disc members as existed during the prior energized state.

As earlier explained, the fingers of the retarder member will only permit the armature to rotate in one direction relative to the pressure plate member. The only way relative motion between the pressure plate member and the armature will be permitted to occur is when the frictional surface wears away. As wear occurs, the same basic cycle as described above occurs and continues to occur until all of the friction material of the friction disc pack is worn away. Note that, as wear occurs, there is no loss of torque between the driven and driving means. The movement between the armature and the adjustment ring is immediate and automatically adjusts the position of the torque transmitting members to compensate for any wear that occurs between the friction discs of the friction disc pack.

While only the preferred embodiment of the invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

What is claimed is:

1. An electromagnetic friction device for transmitting torque comprising:
   input means;
   output means coaxially disposed with said input means;
   means for driving said output means, said driving means translating torque from said input means to said output means, said driving means further comprising:

an inner body member coaxially disposed with said input means for rotating therewith;

means for frictionally engaging said inner body member with said output means;

bearing means mounted coaxial with and adjacent to said inner body member;

electromagnetic means for actuating said friction device;

an armature member disposed adjacent said electromagnetic means and coaxially mounted with said inner body member whereby when said electromagnetic means is energized a circuitous flux path is formed between said electromagnetic means and said armature member;

first means for biasing said frictional engaging means, said biasing means comprising:
  an annular ring member disposed coaxially with said armature member and said inner body member;
  a pressure plate member, said plate member having one end disposed adjacent said annular ring member and an opposite end disposed adjacent said frictional engaging means;
  second means for biasing disposed between said inner body member and said opposite end of said plate member;
  an annular retarder member coaxially disposed with said armature member, said retarder member further communicating with said one end of said plate member for axial but nonrotatable movement with respect to said pressure plate member;
  means for mounting said annular ring member to said one end of said pressure plate member; and
  means for engaging said opposite end of said pressure plate member with said frictional means.

2. An electromagnetic friction device as claimed in claim 1 wherein said input means comprises a power driven shaft.

3. An electromagnetic friction device as claimed in claim 1 wherein said means for frictionally engaging said inner body member with said output means comprises:
  a first plurality of outwardly extending friction discs secured to said inner body member in spaced relationship to said output means;
  a second plurality of inwardly extending friction discs secured to said output means, said inwardly extending friction discs adapted to interengage said outwardly extending friction discs of said inner body member to form a friction disc pack spaced in axial relationship to said first biasing means.

4. An electromagnetic friction device as claimed in claim 1 wherein said second means for biasing comprises a plurality of coil springs.

5. An electromagnetic friction device as claimed in claim 1 wherein said means for driving further includes means for securing said inner body member to said input means.

6. An electromagnetic friction device for transmitting torque comprising:
  an input shaft;
  output means coaxially disposed with said input shaft, said output means having a plurality of radially inwardly extending friction disc members adapted to transmit torque;
  an inner body member coaxially disposed with said input shaft for rotation therewith, said inner body member having one end portion and an opposite end portion, said inner body member further comprising:
    a central axial passage adapted to mount said input shaft;
    a plurality of radially outwardly extending friction disc members secured to said one end portion of the inner body, said outwardly extending friction disc members adapted to interengage said inwardly extending friction disc members of said output means to form a friction disc pack;
    a plurality of axial passages radially disposed between said central axial passage and said outwardly extending friction disc members;
  bearing means mounted to said input shaft adjacent said opposite end portion of the inner body member;
  means for electromagnetically actuating said friction device, said electromagnetic actuating means comprising:
    a magnet body incorporating an electromagnet for creating a magnetic field;
    an armature member coaxially disposed with said opposite end portion of said inner body member, said armature member having a face portion adjacent said magnet body, said armature face portion further being movable axially and rotatably toward and away from said magnet body, said armature member further having an inner helical threaded surface and a serrated second face portion normal to said inner helical threaded surface;
    an annular member disposed between said armature member and said opposite end portion of the inner body member, said annular member having an outer helical threaded surface for communication with said inner helical threaded surface of said armature member;
    a pressure plate member, said pressure plate member having one end portion defining a plurality of axially extending annular fingers, said plurality of fingers being mounted within said plurality of axial passages of said inner body member, said pressure plate member further having an opposite end portion disposed adjacent said friction disc pack for communication therewith;
    means for biasing said pressure plate member mounted between said one end portion of said plate member and said inner body member; and
    an annular retarder member disposed adjacent said armature and slidably mounted to said one end portion of said pressure plate member for axial movement relative thereto, said retarder member further having means for biasing said armature, said means for biasing said armature causing rotational motion of said armature in one direction and restricting rotational motion of said armature in another opposite direction, whereby when said electromagnetic means is energized a circuitous flux path is produced between said armature and said magnet body, said flux path imparting a force on said armature to cause said armature to move axially into engagement with said magnet body, said armature being threadably engaged with said annular ring member such that upon engagement of said armature with said magnet body said armature causes said ring member to move axially along said threaded engagement and through the interconnection with the pressure plate member frictionally engages said plate member with the disc pack thereby causing an axial force to be suppressed upon the friction pack and engaging the output means.

7. In combination with an electromagnetic clutch of the type having a plurality of torque transmitting friction members mounted to an input member and an output means, said input means having an inner body member, said inner body member having passage means, said friction members further adapted to transmit torque from an input means to an output means upon energization of an electromagnetic actuating means and wherein a flux permeable armature is coaxially disposed with said input means directly adjacent said electromagnetic means, said armature having an inner helical threaded surface, the improvement comprising:

a pressure plate member, said pressure plate member having one end portion slidably mounted within said passage means of the inner body member, said pressure plate member further having an opposite end portion disposed adjacent said plurality of torque transmitting friction members for communication therewith;

means for biasing said pressure plate member, said biasing means being disposed between said inner body member and said opposite end portion of said pressure plate member;

an annular member coaxially disposed with said armature member and said inner body member, said annular member having an outer helical threaded surface for communication with said inner helical threaded surface of said armature; and an annular retarder member disposed adjacent said armature member and slidably mounted to said one end portion of said pressure plate member for axial movement relative thereto, said retarder member having means for biasing said armature, said means for biasing said armature causing rotational motion of said armature in one direction and restricting rotational motion of said armature in another direction, whereby when said electromagnetic means is energized a circuitous flux path is produced between said armature and said electromagnetic means, said flux path imparting a force on said armature to cause said armature to move axially into engagement with said electromagnetic means, said armature being threadably engaged with said annular member such that upon engagement of said armature with said electromagnetic means said annular member moves axially along said mutually engageable threads and through the interconnection with said pressure plate member causing said plate member to impart an axial force upon said plurality of friction members and engage said output means.

* * * * *